(12) United States Patent
Liu et al.

(10) Patent No.: US 12,313,597 B2
(45) Date of Patent: May 27, 2025

(54) METHOD FOR MONITORING SERVICE STATE OF SWITCH RAIL BASED ON FEATURE FUSION

(71) Applicant: HANGZHOU ZHEDA JINGYI ELECTROMECHANICAL TECHNOLOGY CORPORATION LIMITED, Hangzhou (CN)

(72) Inventors: Weixu Liu, Hangzhou (CN); Zhifeng Tang, Hangzhou (CN); Xiang Zhao, Hangzhou (CN); Pengfei Zhang, Hangzhou (CN); Fuzai Lv, Hangzhou (CN)

(73) Assignee: HANGZHOU ZHEDA JINGYI ELECTROMECHANICAL TECHNOLOGY CORPORATION LIMITED, Hangzhou (CN)

( * ) Notice: Subject to any disclaimer, the term of this patent is extended or adjusted under 35 U.S.C. 154(b) by 423 days.

(21) Appl. No.: 18/008,197

(22) PCT Filed: Nov. 2, 2021

(86) PCT No.: PCT/CN2021/128078
§ 371 (c)(1),
(2) Date: Dec. 5, 2022

(87) PCT Pub. No.: WO2022/134868
PCT Pub. Date: Jun. 30, 2022

(65) Prior Publication Data
US 2023/0176016 A1      Jun. 8, 2023

(30) Foreign Application Priority Data

Dec. 25, 2020    (CN) .......................... 202011560181.5

(51) Int. Cl.
*G01N 29/12*    (2006.01)
*B61K 9/10*    (2006.01)
*G01N 29/44*    (2006.01)

(52) U.S. Cl.
CPC ............... *G01N 29/12* (2013.01); *B61K 9/10* (2013.01); *G01N 29/4472* (2013.01);
(Continued)

(58) Field of Classification Search
None
See application file for complete search history.

(56) References Cited

U.S. PATENT DOCUMENTS 11,124,211 B2 *   9/2021   Cooper ................. B61L 25/025
2012/0279308 A1   11/2012  Yan et al.

FOREIGN PATENT DOCUMENTS

CN      104776908 A      7/2015
CN      105203645 A     12/2015
(Continued)

OTHER PUBLICATIONS

Hu Jianhong, et al., Research on Guided Wave Inspection Technology for Rail Base Defect of Turnout, China Railway Science, 2014, pp. 34-40, vol. 35, No. 3.
(Continued)

*Primary Examiner* — Walter L Lindsay, Jr.
*Assistant Examiner* — Geoffrey T Evans
(74) *Attorney, Agent, or Firm* — Bayramoglu Law Offices LLC

(57) ABSTRACT

A method for monitoring a service state of a switch rail based on feature fusion includes: mounting an ultrasonic guided wave monitoring apparatus on the switch rail to perform online defect identification and simulation of the switch rail, and establishing a baseline signal library, where the ultrasonic guided wave monitoring apparatus generates a guided wave signal propagating along the switch rail and receives an echo signal of the guided wave signal; performing feature extraction; extracting a healthy feature vector, and nondimensionalizing; selecting a defect-sensitive feature, and acquiring, by a BPSO algorithm, a best feature subset; training an LS-SVM through the best feature subset by a cross-validation method to acquire an automatic online defect identification model of the switch rail based on the LS-SVM; and monitoring the switch rail by the automatic (Continued)

online defect identification model of the switch rail based on the LS-SVM.

7 Claims, 6 Drawing Sheets

(52) U.S. Cl.
CPC ............... *G01N 2291/023* (2013.01); *G01N 2291/0289* (2013.01); *G01N 2291/2623* (2013.01)

(56) References Cited

FOREIGN PATENT DOCUMENTS

| | | |
|---|---|---|
| CN | 110246134 A | 9/2019 |
| CN | 111767897 A | 10/2020 |
| CN | 112858473 A | 5/2021 |

OTHER PUBLICATIONS

Xiong Longhui, Research on Magnetic Flux Leakage Technique for Rail Cracks, A Thesis in Measuring and Testing Technology and Instruments, Nanjing University of Aeronautics and Astronautics The Graduate School College of Automation Engineering, 2014, pp. 1-68.

\* cited by examiner

METHOD FOR MONITORING SERVICE STATE OF SWITCH RAIL BASED ON FEATURE FUSION

CROSS REFERENCE TO THE RELATED APPLICATIONS

This application is the national phase entry of International Application No. PCT/CN2021/128078, filed on Nov. 2, 2021, which is based upon and claims priority to Chinese Patent Application No. 202011560181.5, filed on Dec. 25, 2020, the entire contents of which are incorporated herein by reference.

TECHNICAL FIELD

The present disclosure relates to a track monitoring system and method, and in particular to a method for monitoring a service state of a switch rail based on feature fusion.

BACKGROUND

In China, with the rapid development of the national economy in recent years, railway transportation, the lifeline of the national economy, has undergone unprecedented development. Accordingly, the traffic density, running speed, and load capacity of railway traffic have been greatly improved, and the load and impact on the rail, which is an important part of the track, have also been greatly increased. This will inevitably increase the probability of damage to the rails, especially the switch rails, and bring great challenges to the reliable and safe operation of the track. There are tens of thousands of switch rails in the high-speed railway system. As an indispensable part of the high-speed railway system, the switch rails directly affect the safe and stable operation of the train. Different from the stock rail, the switch rail has a small part fixed by fasteners on the sleepers and a large part movable freely based on train operation requirements.

The increase in train running speed and the complex and harsh working conditions in the natural environment inevitably cause the switch rail to bear more fatigue loads than the stock rail, making it more prone to catastrophic accidents and endangering people's lives and property. Therefore, it is necessary to monitor the service state of the switch rail by effective and reliable means.

Guided wave technology is a novel and practical method for monitoring the switch rail. The guided wave can propagate over long distances and are sensitive to defects, so remote online assessment of the integrity of the switch rail can be performed from a single test point (Hu Jianhong, Tang Zhifeng, Jiang Jinzhou, et al. *Research on Guided Wave Inspection Technology for Rail Base Defect of Turnout* [J]. China Railway Science, 2014, 35(3).). In addition, since the guided wave can be used to detect a large area in a short time (at a speed of several kilometers per second), it meets the requirements of fast and efficient scanning and monitoring of high-speed railways. Ultrasonic guided wave technology is widely used in non-destructive testing and online monitoring in various industries due to its long-distance, large-scale, full-section detection, and single-ended transceiver design. In terms of material and component type, the guided wave technology is very suitable for monitoring and evaluating the service state of the railway switch rail. However, considering that the switch rail has complex structural features and involves many fasteners, the traditional point-to-point non-destructive testing methods, such as ultrasonic testing, eddy current testing, magnetic flux leakage (MFL) testing (Xiong Longhui. *Research on Magnetic Flux Leakage Detection Technology for Rail Cracks* [D]. Nanjing University of Aeronautics and Astronautics, 2014.), machine vision (MV), and penetration testing, are difficult to meet the strict requirements of actual monitoring, including timeliness, in an online cloud environment, reliability, and a wide range of regions. Meanwhile, since the railway line is very busy, the use of the "skylight period" to conduct offline manual detection and monitoring of the track can no longer meet the actual demand for railway detection and monitoring.

Therefore, in order to achieve economical and safe railway operation, there is an urgent need for an effective structural health monitoring method for online monitoring the switch rail.

SUMMARY

In order to solve the above-mentioned problems existing in the prior art, the present disclosure proposes a method for monitoring a service state of a switch rail based on feature fusion, which realizes automatic, online, and real-time monitoring of the service state of the switch rail.

As shown in FIG. 1, the present disclosure is implemented by the following technical solution:

S1: Mounting an ultrasonic guided wave monitoring apparatus on a switch rail to perform online defect identification and simulation of the switch rail and establishing a baseline signal library, where the ultrasonic guided wave monitoring apparatus generates a guided wave signal propagating along the switch rail and receives an echo signal of the guided wave signal.

S1.0: Acquiring, by the ultrasonic guided wave monitoring apparatus, an echo signal x'(n) in real time, where the echo signal is acquired by sampling multiple sample points continuously in a time series; n denotes a serial number of the sample point in the echo signal; the echo signal includes a healthy echo signal $x'_1(n)$ of the switch rail in a healthy state and a defective echo signal $x'_2(n)$ of the switch rail in a simulated defective state; the healthy echo signal $x'_1(n)$ and the defective echo signal $x'_2(n)$ have an identical count.

The guided wave signal may be affected by a variety of sources, including on-site environmental conditions, waveguide boundary conditions, waveguide vibration, and noise caused by an electronic monitoring system. These factors may lead to misjudgments of the service state of the switch rail. Therefore, before feature extraction, the guided wave signal should be preprocessed.

S1.1: Preprocessing the acquired echo signal x'(n) by normalization:

$$x(n) = \frac{x'(n) - \frac{1}{M}\sum x'(n)}{\sqrt{\frac{1}{M}\sum\left(x'(n) - \frac{1}{M}\sum x'(n)\right)^2}}$$

where M denotes the length of the echo signal x'(n), that is, a total count of sample points in the echo signal; and n denotes the serial number of the sample point in the echo signal.

Through the preprocessing of the healthy echo signal $x'_1(n)$ and the defective echo signal $x'_2(n)$, a healthy baseline signal $x_1(n)$ and a defective baseline signal $x_2(n)$ are acquired. The healthy baseline signal $x_1(n)$ and the defective baseline signal $x_2(n)$ are baseline signals $x(n)$. All different baseline signals, totaling BN, form the baseline signal library. The healthy baseline signal $x_1(n)$ and the defective baseline signal $x_2(n)$ each account for half of the baseline signal library.

The present disclosure improves data quality through preprocessing and avoids misjudgment of the service state of the switch rail.

S2: Performing feature extraction on the preprocessed baseline signal $x(n)$.

S3: Randomly extracting a healthy baseline signal of the switch rail in the healthy state from the baseline signal library and processing the healthy baseline signal to acquire a feature vector as a healthy feature vector $F_{baseline}$:

$$F_{baseline}=(SF_1^{baseline} \text{ to } SF_{18}^{baseline}, ESEF_1^{baseline}, ESEF_2^{baseline})$$

where $SF_1^{baseline}$ to $SF_{18}^{baseline}$ denote the first 18 feature parameters of the healthy feature vector $F_{baseline}$, respectively; $ESEF_1^{baseline}$, $ESEF_2^{baseline}$ denote the last two feature parameters of the healthy feature vector $F_{baseline}$, respectively.

Nondimensionalizing each baseline signal $x(n)$ in the baseline signal library:

$$e(F_{monitoring}/F_{baseline})-e$$

where e denotes a Napierian base.

Each of these elements is substituted into the formula for nondimensionalization.

Acquiring, by the nondimensionalization, a feature vector ssf of the guided wave signal of the switch rail:

$$ssf=SF_1^{dimensionless} \text{ to } SF_{18}^{dimensionless}, ESEF_1^{dimensionless}, ESEF_2^{dimensionless})$$

where $SF_1^{dimensionless}$ to $SF_{18}^{dimensionless}$ denote the first 18 feature parameters of the feature vector ssf of the guided wave signal of the switch rail, respectively; $ESEF_1^{dimensionless}$, $ESEF_2^{dimensionless}$ denote the last two feature parameters of the feature vector ssf of the guided wave signal of the switch rail, respectively.

S4: Selecting a defect-sensitive feature from the feature vector ssf of the guided wave signal of the switch rail and acquiring, by a binary particle swarm optimization (BPSO) algorithm, a best feature subset by: calculating a fitness function of a population after each iteration, updating a local best solution pbest and a global best solution gbest to acquire a final global best solution gbest and a serial number NF of the selected feature and taking the final global best solution gbest as the best feature subset $SSF_{gbest}$, $SSF_{gbest}=\{ssf_1, ssf_2, \ldots, ssf_{BN}\}$, where BN denotes the count of the baseline signals in the baseline signal library.

In the best feature subset $SSF_{gbest}$, each feature vector ssf of the guided wave signal of the switch rail has an identical count of identical feature parameters, which are selected from a part of 20 elements of the feature vector $F_{monitoring}$.

S5: Acquiring an automatic online defect identification model of the switch rail based on the least squares support vector machine (LS-SVM):

taking the best feature subset $SSF_{gbest}$ as a training set of the LS-SVM and training, by a cross-validation method, to acquire the automatic online defect identification model of the switch rail based on the LS-SVM.

In the best feature subset $SSF_{gbest}$, the features corresponding to the defective echo signal $x'_2(n)$ and the healthy echo signal $x'_2(n)$ each account for half of BN. These two types of signals are marked as the healthy state and the simulated defective state of the switch rail, respectively.

S6: Monitoring the switch rail by the automatic online defect identification model of the switch rail based on the LS-SVM:

processing, by steps S1 to S3, a target echo signal MS(n) of the switch rail acquired in real time to acquire a feature vector of a guided wave signal of the switch rail, namely $ssf_{ms}=SF_1^{dimensionless}$ to $SF_{18}^{dimensionless}$, $ESEF_1^{dimensionless}$, $ESEF_2^{dimensionless}$); performing, by step S4, feature selection on the feature vector $ssf_{ms}$ of the guided wave signal of the switch rail based on a serial number NF of a feature to acquire a feature vector $ssf_{ms}^{new}$ of the guided wave signal of the switch rail; inputting the feature vector $ssf_{ms}^{new}$ of the guided wave signal of the switch rail into the automatic online defect identification model of the switch rail based on the LS-SVM acquired in step S5; and outputting a current service state of the switch rail, which is a healthy state or a defective state.

Step S2 specifically includes:

S2.1: Extracting a time-domain statistical feature and a power spectrum-domain statistical feature of the preprocessed baseline signal $x(n)$, where the time-domain statistical feature includes skewness ($SF_1$), kurtosis ($SF_2$), peak-to-peak value ($SF_3$), kurtosis factor ($SF_4$), root mean square (RMS) ($SF_5$), standard deviation ($SF_6$), crest factor ($SF_7$), shape factor ($SF_8$), pulse factor ($SF_9$), maximum ($SF_{10}$), variance ($SF_{16}$), minimum ($SF_{17}$), root mean square amplitude (RMSA) ($SF_{18}$), and margin factor ($SF_{10}$); and the power spectrum-domain statistical feature includes RMS ($SF_{11}$), standard deviation ($SF_{12}$), and centroid ($SF_{13}$).

S2.2: Performing feature extraction on the preprocessed baseline signal $x(n)$ by time-frequency analysis.

The time-frequency domain feature extraction of the baseline signal $x(n)$ is carried out by a time-frequency analysis method based on a complementary ensemble empirical mode decomposition (CEEMD).

Performing CEEMD on the baseline signal $x(n)$ to acquire a set of intrinsic mode functions (IMFs) with different frequency bands from high to low, IMFs=$\{c_1(n), c_2(n), \ldots, c_N(n)\}$, $n \in [1,M]$:

$$x(n)=\Sigma_{t=1}^{N} c_t(n)+r_n(n)$$

where $c_t(n)$ denotes a t-th IMF obtained after the CEEMD, N denotes a total count of the IMFs, and $r_n(n)$ denotes an n-th residual component.

Calculating the count N of the IMFs with different frequency bands based on the length M of the input baseline signal $x(n)$:

$$N=\lfloor \log_2(M) \rfloor$$

where $\lfloor \log_2(M) \rfloor$ denotes a maximum integer not greater than $\log_2(M)$.

S2.3: Reconstructing the preprocessed baseline signal $x(n)$ according to the IMF to acquire a reconstructed signal:

$$y(n)=\Sigma_{q=1}^{N} c_q(n)$$

where $y(n)$ denotes the reconstructed signal of the baseline signal $x(n)$ based on the CEEMD.

S2.4: Extracting an average energy feature $SF_{14}$ of the baseline signal x(n) according to the reconstructed signal y(n) based on the CEEMD:

$$SF_{14} = \frac{1}{M}\sum_{n=1}^{M} y^2(n)$$

where y(n) denotes the reconstructed signal of the baseline signal x(n) based on the CEEMD.

S2.5: Extracting a spectral entropy feature of the baseline signal x(n) according to the reconstructed signal y(n) based on the CEEMD.

Extracting the spectral entropy feature of the baseline signal x(n) based on the CEEMD.

The spectral entropy features include the local energy spectral entropy feature $ESEF_1$ of the first two IMFs (high-frequency components) and the global spectral entropy feature $ESEF_2$ of all IMFs. $ESEF_1$ denotes local defect information, and $ESEF_2$ denotes global defect information of the switch rail.

The local spectral entropy feature $ESEF_1$ is expressed as:

$$ESEF_1 = \sum_{i=1}^{M} p_i(e^{(1-p_i)} - 1)$$

$$p_i = \frac{\psi(i)^2}{\sum_{i=1}^{M} \psi(i)^2},$$

where $p_i$ denotes an energy coefficient of an i-th sample point in the baseline signal x(n) and $\psi(i)$ denotes a locally reconstructed signal acquired by reconstruction using the first two IMFs.

The global spectral entropy feature $ESEF_2$ is expressed as:

$$ESEF_2 = \sum_{j=1}^{N} \sum_{i=1}^{M} p_{ij}(e^{(1-p_{ij})} - 1)$$

$$p_{ij} = \frac{c_{ij}^2}{\sum_{i=1}^{M} y(n)^2}$$

where $p_{ij}$ denotes an energy coefficient of an i-th sample point of a j-th IMF in the baseline signal x(n), e denotes a Napierian base, and $c_{ij}$ denotes a value of the i-th sample point of the j-th IMF.

Through the above process, the feature of each baseline signal in the baseline signal library is extracted, and all feature extraction results form a feature vector $F_{monitoring}$ of the baseline signal from different signal processing domains, $F_{monitoring}=(SF_1$ to $SF_{18}, ESEF_1, ESEF_2)$.

14 time-domain statistical features, 3 power spectrum-domain statistical features, and a common average energy feature SF14 constitute the first 18 feature parameters in the feature vector $F_{monitoring}$. The local spectral entropy feature $ESEF_1$ and the global spectral entropy feature $ESEF_2$ constitute the last two feature parameters in the feature vector $F_{monitoring}$.

The healthy echo signal of the switch rail in the healthy state includes echo signals acquired from different positions of the base, the web, and the head of the switch rail in the healthy state and includes echo signals of the switch rail in three states of closed, open and moving, each accounting for one-third of all echo signals of the switch rail in the healthy state.

The defective echo signal of the switch rail in the simulated defective state includes echo signals acquired from different positions of the base, the web, and the head of the switch rail in the simulated defective state and includes echo signals of the switch rail in the three states of closed, open and moving, each accounting for one-third of all echo signals of the switch rail in the simulated defective state.

The healthy state refers to the absence of cracks or simulated metal block or other defects on the switch rail, including three different service states of the switch rail, namely closed, open and moving. The simulated defective state is realized by sticking metal block to different positions of the base, web, and head of the switch rail in the three different service states of the switch rail, namely closed, open and moving.

The LS-SVM uses a Gaussian radial basis function as a kernel function, and the cross-validation method is a leave-one-out method. The number BN of the baseline signals in the baseline signal library is at least 240.

In a specific implementation, the initialization parameters of the population in the BPSO algorithm include: number of particles Num: 20; maximum number of iterations Die: 100; maximum iteration speed $V_{max}$: 6; minimum iteration speed $V_{min}$: −6; learning factor c1: 2; c2: 2; and serial number of the selected feature NF: 0.

The fitness function is calculated as a ratio of an intra-class Mahalanobis distance to an inter-class Mahalanobis distance by the following steps:

calculating a Mahalanobis distance of a j-th class:

$$d_j = \frac{1}{n_j}\sum_{k=1}^{n_j}\sum_{i=1}^{\gamma}\sqrt{(ssf_{ik} - v_j)^T \psi_j^{-1}(ssf_{ik} - v_j)}$$

$$(j = 1, 2, \ldots, p)$$

$$v_j = \frac{1}{2}\sum_{i=1}^{n_j} ssf_{ik}$$

where $v_j$ denotes a centroid vector of the j-th class; p denotes a count of classes, which is 2, including the healthy state and the defective state; $\psi_j$ denotes a covariance matrix of a feature set $SSF_j$, $SSF_1=\{ssf_1, ssf_2, \ldots, ssf_{n_j}\}$; $SSF_j$ is a set of feature vectors ssf of the guided wave signal of the switch rail based on the baseline signals of the j-th class; $ssf_{n_j}$ denotes a feature vector of the guided wave signal of the switch rail based on an $n_j$-th sample; $n_j$ denotes a count of the baseline signals of the j-th class; $\gamma$ denotes a dimension of the feature vector $ssf_i$, and each feature vector $ssf_i(i=1, \ldots, n_j)$ has the same dimension; T denotes a matrix transposition; and $ssf_{ik}$ denotes an i-th feature in a k-th feature vector of the guided wave signal of the switch rail; calculating the intra-class Mahalanobis distance d and the inter-class Mahalanobis distance dd by the Mahalanobis distance of the j-th class:

$$d = 1/p\Sigma d_j$$

$$dd = \sqrt{(v_1 - v_2)^T \zeta (v_1 - v_2)}$$

where $\zeta$ denotes a variance of a vector $v_1$; the vector $v_1$ denotes a centroid vector of a $1^{st}$ class, and a vector $v_2$ denotes a centroid vector of a $2^{nd}$ class; and calculating the fitness function of the BPSO algorithm:

$$\text{fitness} = e^{d}(dd+\tau)$$

where τ denotes a non-zero parameter of the fitness function, and T specifically a very small arbitrary non-zero positive number to ensure that the denominator is not zero.

The echo signal may be a pulse echo model or a guided wave signal measured in a single-transmit and single-receive mode.

An output result of the automatic online defect identification model of the switch rail based on the LS-SVM is that the switch rail is healthy, or the switch rail is defective.

The present disclosure proposes to extract multiple features from the signal's time domain, power spectrum domain, and time-frequency domain according to the structure and characteristics of the switch rail and the guided wave. The present disclosure also defines a defect index to eliminate the effects of the environment, operating conditions, signal power, and other factors. In addition, the present disclosure proposes a feature selection method based on the BPSO algorithm, which selects the defect-sensitive feature by defining a fitness function and eliminates irrelevant and redundant features, thereby improving the classification performance.

Finally, the present disclosure establishes the automatic classification model based on the LS-SVM, which reduces the probability of incorrect diagnosis and improves the generalization ability to unknown environments and defects.

The spectral entropy feature of the CEEMD-based guided wave signal defined by the present disclosure innovatively includes ESEF1 that denotes local defect information and ESEF2 that denotes global defect information of the switch rail. Compared with other institutional extraction methods, the present disclosure achieves better performance and can be used to identify different types of defects. The expression form of the spectral entropy defined by the present disclosure is important. Compared with the traditional Shannon entropy form, the exponential entropy form adopted by the present disclosure can be more stably used for switch rail monitoring.

In the traditional Shannon entropy form $H(P)=-\Sigma_{i=1}^{n} p_i \log p_i$, the probability of the i-th source is expressed as pt. There is a conceptual problem, that is, if pi→0, then log(pi)→∞, which will lead to the failure of guided wave monitoring in practical applications. For example, when the monitor program is executed in MATLAB, it outputs NAN (not a number) and thus does not work. The present disclosure solves this technical problem.

The present disclosure has the following beneficial effects:

The switch rail includes highly nonlinear and non-stationary defects that have a large impact on the guided wave signal. Therefore, it is hard to fully characterize these defects with the time-domain and power spectrum-domain features alone. To this end, the present disclosure further performs feature extraction based on time-frequency analysis of the guided wave signal. Empirical mode decomposition (EMD) is an effective adaptive time-frequency data analysis method for nonlinear and non-stationary signal analysis. The present disclosure adopts the upgraded version of EMD, that is, the time-frequency analysis method based on CEEMD to extract the time-frequency domain feature of the guided wave signal.

The present disclosure adopts the Mahalanobis distance, which is not affected by dimension and can eliminate the correlation interference between variables, as a measure of the fitness function, which has important practical application value. In actual switch rail monitoring, the defect samples are limited. The LS-SVM adopted by the present disclosure can deal with small samples, nonlinear and high-dimensional problems, and is very suitable for the analysis and processing of the switch rail.

The present disclosure has the characteristics of online real-time, low cost, and high robustness. The present disclosure solves the problems existing in the traditional detection and monitoring means and improves the level of automatic and intelligent evaluation and monitoring of the service state of the railway line network. The inherent advantages of ultrasonic guided wave technology will greatly improve the detection and monitoring of the efficiency, scope, and reliability of railway tracks. The present disclosure mines the guided wave big data acquired from long-term monitoring of the switch rail and improves the monitoring accuracy through feature extraction and dimension reduction. The present disclosure makes a lot of innovations in the feature extraction of the algorithm.

The present disclosure only needs to establish a sample library with a small number of signals for the initial stage of service of the switch rail and perform multi-dimensional monitoring and analysis to realize the evaluation and positioning of multiple defects.

Therefore, the present disclosure can effectively realize reliable monitoring of the integrity of a switch rail, greatly improve the cross-regional and real-time monitoring, and has important practical significance and engineering value.

BRIEF DESCRIPTION OF THE DRAWINGS

FIG. 3A is a three-dimensional diagram of an original feature and FIG. 3B is a three-dimensional diagram of a dimensionless feature.

DETAILED DESCRIPTION OF THE EMBODIMENTS

The present disclosure will be further described in detail below in conjunction with the drawings and embodiments.

Figure 1:
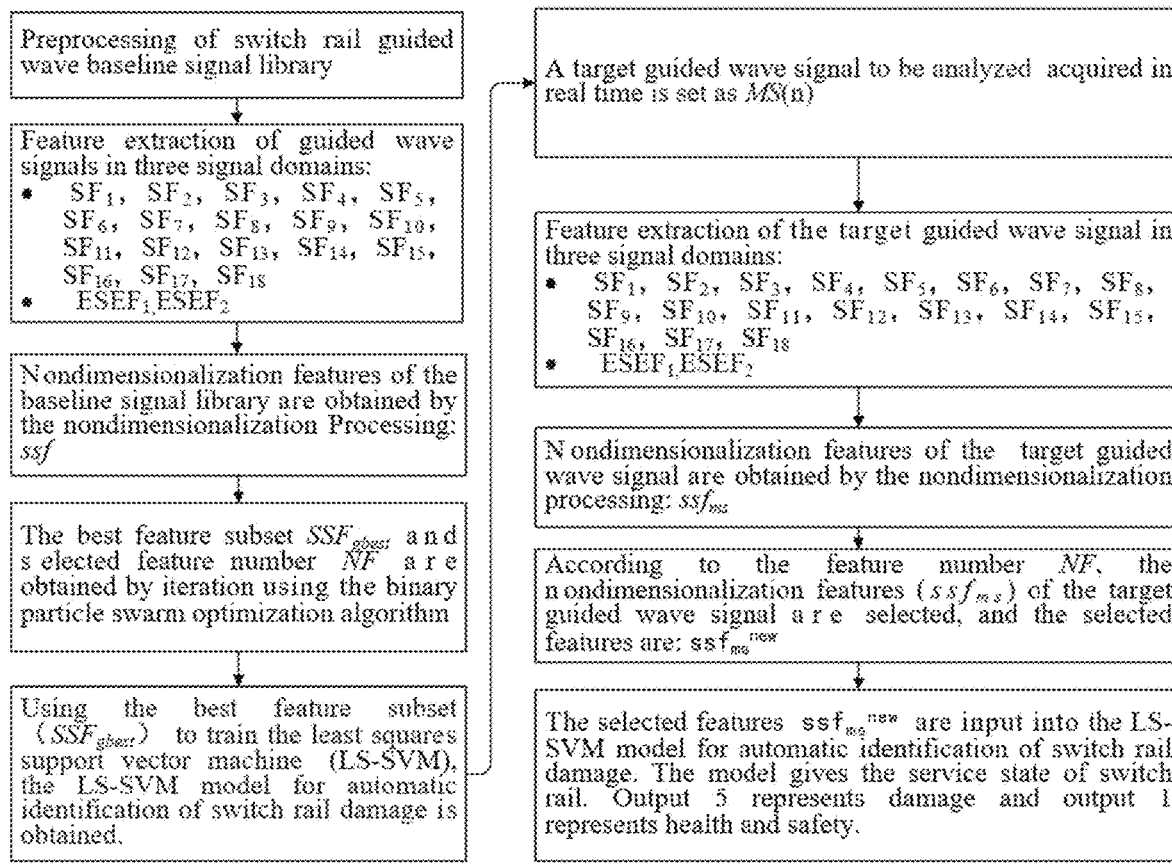
FIG. 1 is a flowchart of a monitoring method according to the present disclosure.

As shown in FIG. 1, an embodiment implemented according to the method of the present disclosure is as follows:

As shown in FIG. 1 to FIG. 8, the present disclosure performs monitoring processing and analysis according to a guided wave signal acquired by monitoring.

Figure 2:
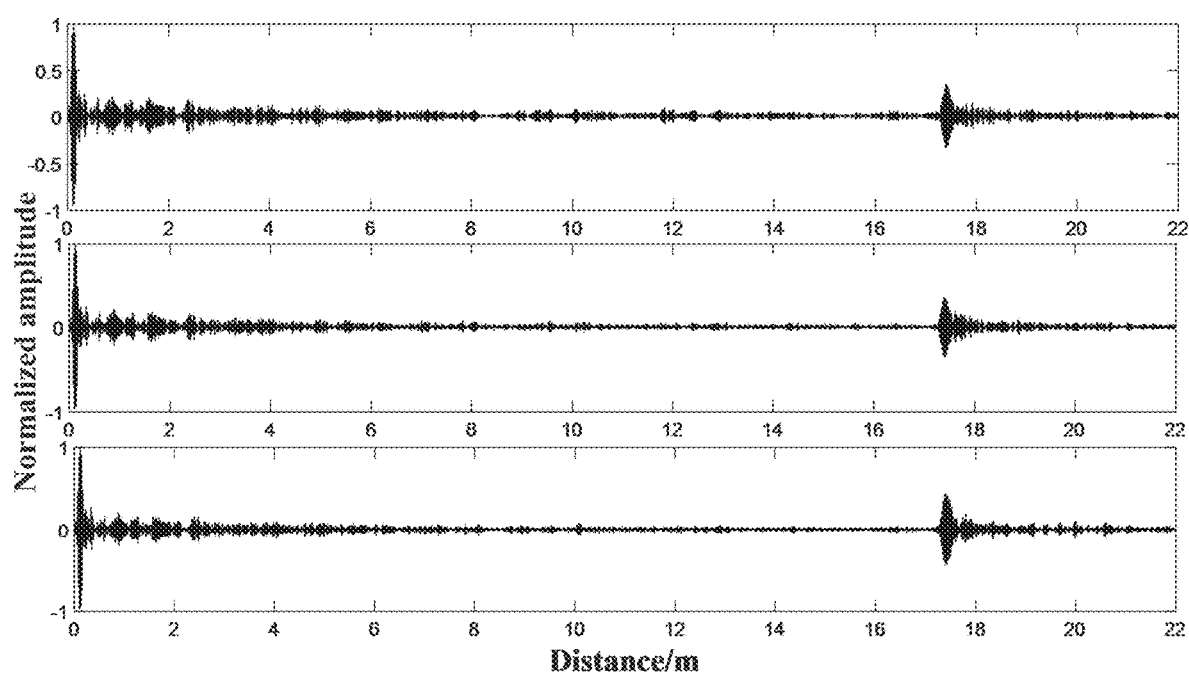
FIG. 2 is a diagram of a time-domain guided wave signal according to an embodiment of the present disclosure.

A missing report rate test was performed on the base of a switch rail to validate the present disclosure. According to step S1, during the monitoring process, there was no defect on the switch rail, and the switch rail was in three states: open, closed and moving. 437 healthy echo signals $x'_1(n)$ in a healthy state were acquired. Simulation metal block were attached, and the switch rail was in three states of open, closed and moving. 437 defective echo signals $x'_2(n)$ in a simulated defective state were further acquired. FIG. 2 shows a typical time-domain guided wave signal of the switch rail in the three working states. FIG. 2 shows, from top to bottom, the healthy guided wave signals in the three states of open, closed and moving.

Figure 3A:
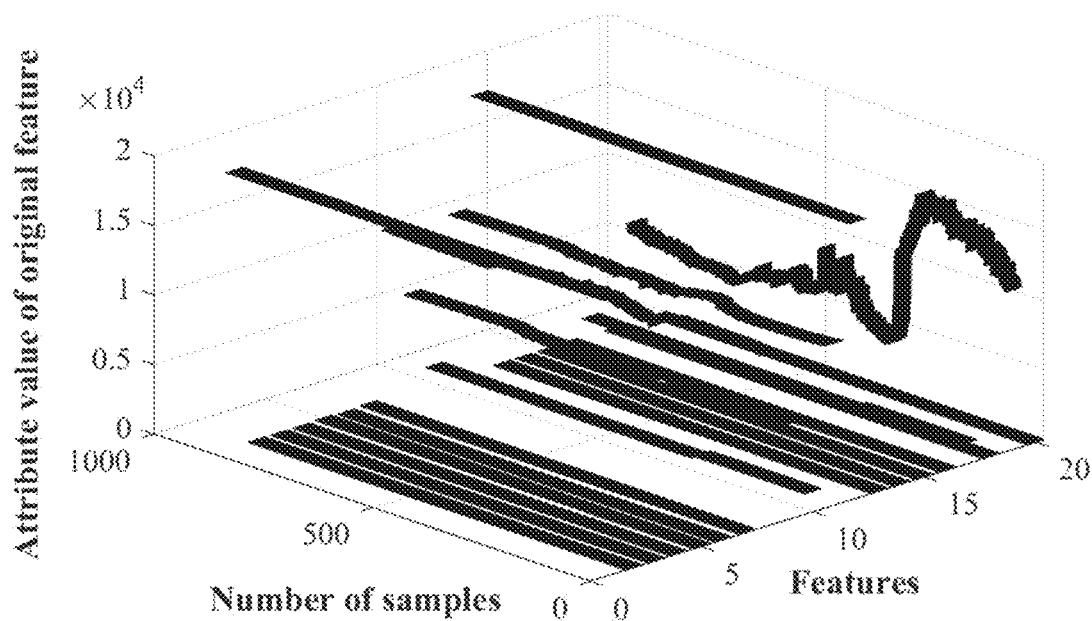
FIGS. 3A and 3B show diagrams of a baseline signal extracted from a baseline signal library according to an embodiment of the present disclosure, where
Figure 3B:
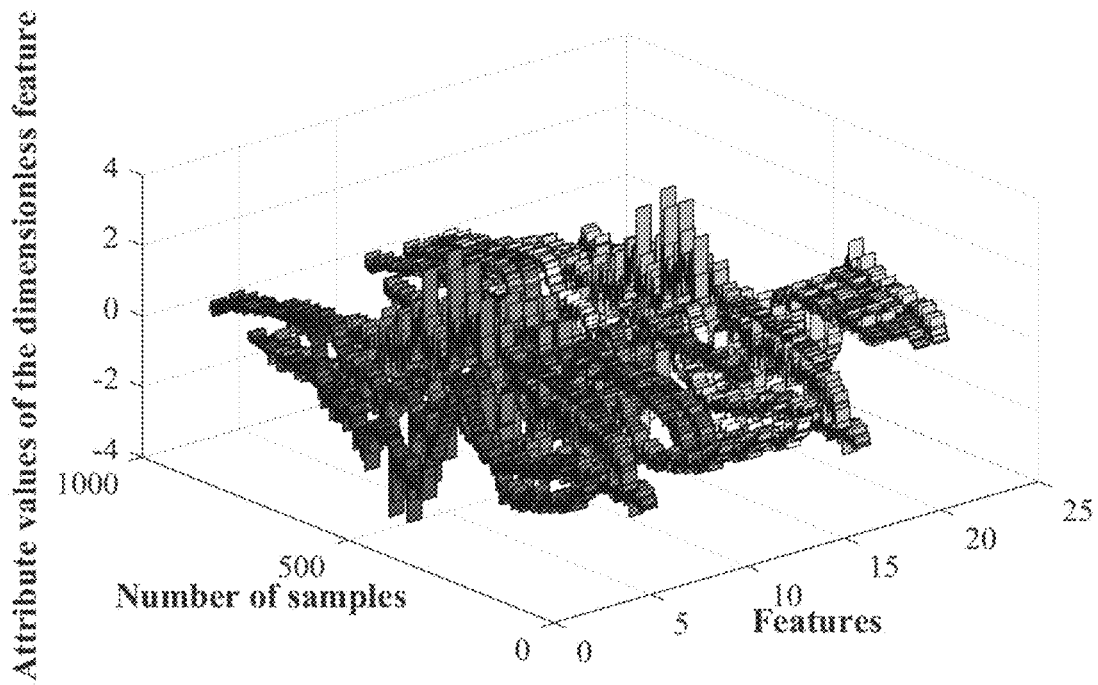
Figure 4:
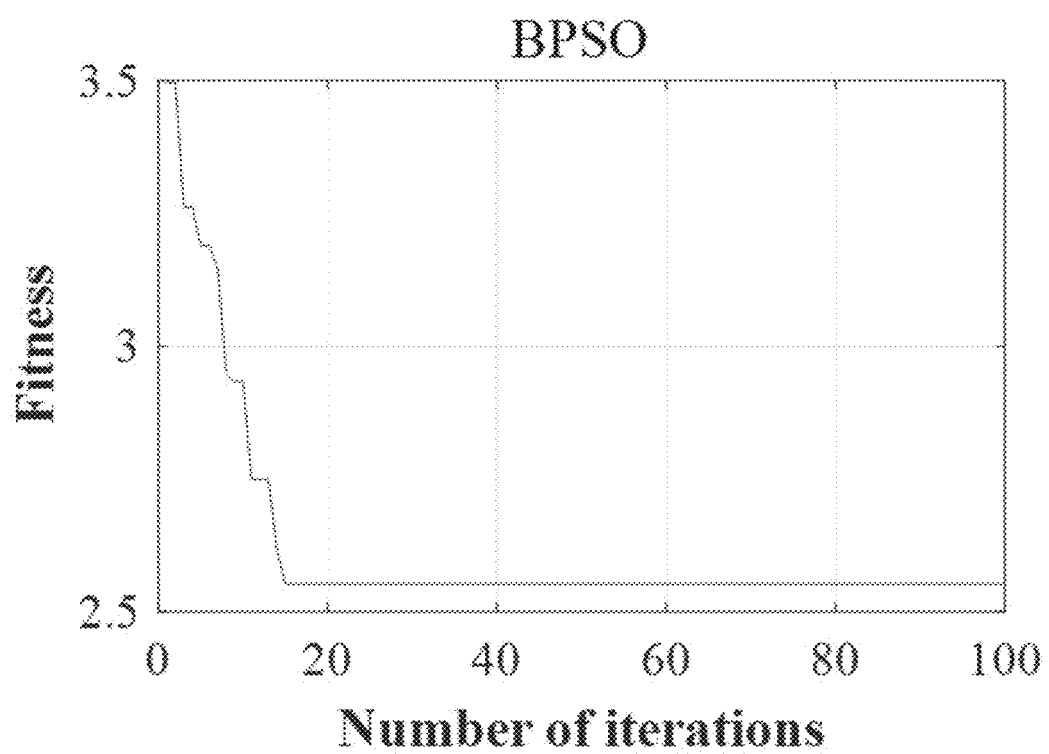
FIG. 4 is an iterative convergence graph of a binary particle swarm optimization (BPSO) algorithm according to an embodiment of the present disclosure.
Figure 5:
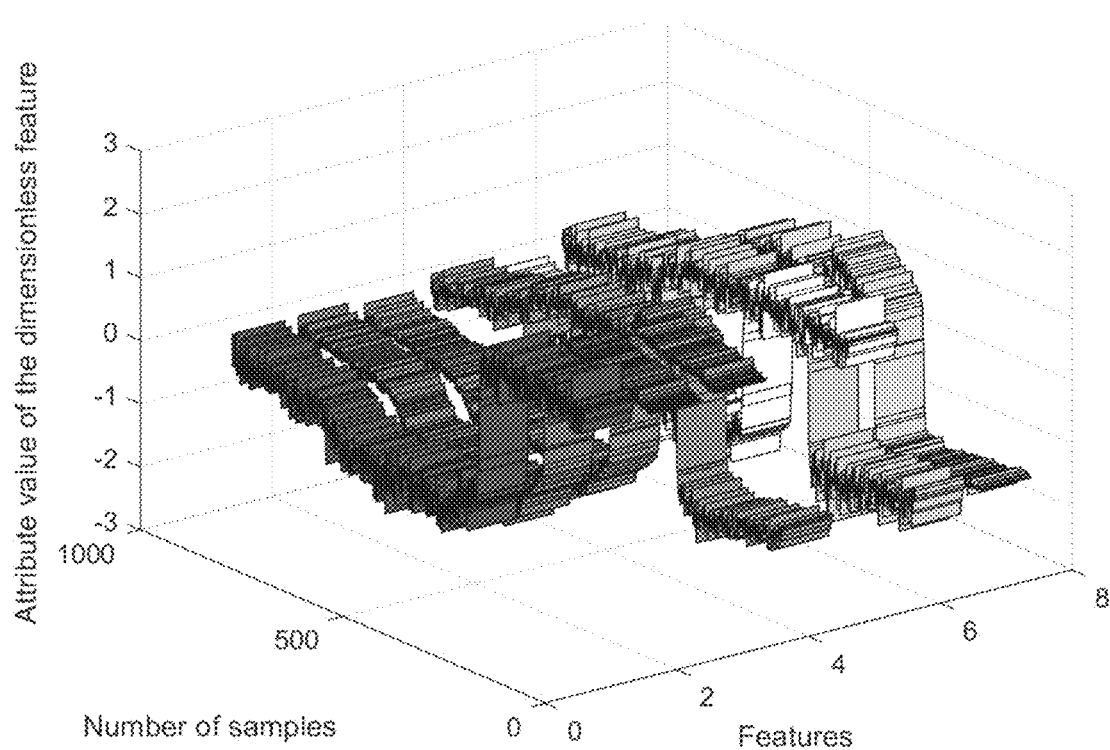
FIG. 5 is a three-dimensional diagram of a best feature subset of the baseline signal extracted from the baseline signal library acquired by an iteration of the BPSO algorithm according to an embodiment of the present disclosure.

The guided wave signals were preprocessed according to step S1.1 to improve the data quality. After preprocessing, a healthy baseline signal $x_1(n)$ and a defective baseline signal $x_2(n)$ were acquired. The healthy baseline signal $x_1(n)$ and the defective baseline signal $x_2(n)$ were baseline signals $x(n)$. A baseline signal library was formed by all different baseline signals. The number of baseline signals in the baseline signal library was BN=874. Further, feature extraction was performed on the preprocessed baseline signal $x(n)$ according to step S2. First, a time-domain statistical feature was extracted, including skewness (SF1), kurtosis (SF2), peak-to-peak value (SF3), kurtosis factor (SF4), root mean square (RMS) (SF5), standard deviation (SF6), crest factor (SF7), shape factor (SF8), pulse factor (SF9), average energy feature (SF14), maximum (SF15), variance (SF16), minimum (SF17), root mean square amplitude (RMSA) (SF18), and margin factor (SF10). Then, a power spectrum-domain statistical feature was extracted, including RMS (SF11), standard deviation (SF12), and centroid (SF13). Finally, a time-frequency analysis feature was extracted, including $ESEF_1$ and $ESEF_2$. FIG. 3A shows a three-dimensional feature diagram of the 874 baseline signals. Due to the different dimensions of these original features, the size range of the features is quite different, which is not conducive to subsequent machine learning. To this end, according to step S3, the feature vector of the baseline signal was subjected to nondimensionalization, and the three-dimensional feature diagram of 874 samples was acquired. As shown in FIG. 3B, these features were all in a similar size range. According to step S4, damage-sensitive feature selection was performed on the nondimensionalized feature vector of the switch rail to acquire a best feature subset. The initialization iteration parameters include the number of particles in the population, Num=20; the maximum number of iterations, Die=100; the maximum iteration speed, $VV_{max}=6$; the minimum iteration speed, $VV_{min}=-6$; and the learning factors, c1=c2=2. After 100 iterations, a final damage-sensitive best feature subset $SSF_{gbest}$, was acquired, as shown in FIG. 5. The serial numbers of the selected features are NF={2 3 5 7 12 19 20}. Through a fitness function of the binary particle swarm optimization (BPWO) algorithm, a convergence curve was acquired after the iteration, as shown in FIG. 4. A 7-dimensional damage-sensitive feature subset of CH1 and CH2 was selected. According to step S5, the final damage-sensitive best feature subset $SSF_{gbest}$, was taken as a training set of the least squares vector machine (LS-SVM). An automatic online defect identification model of the switch rail based on the LS-SVM was acquired by training through a leave-one-out method.

Figure 6:
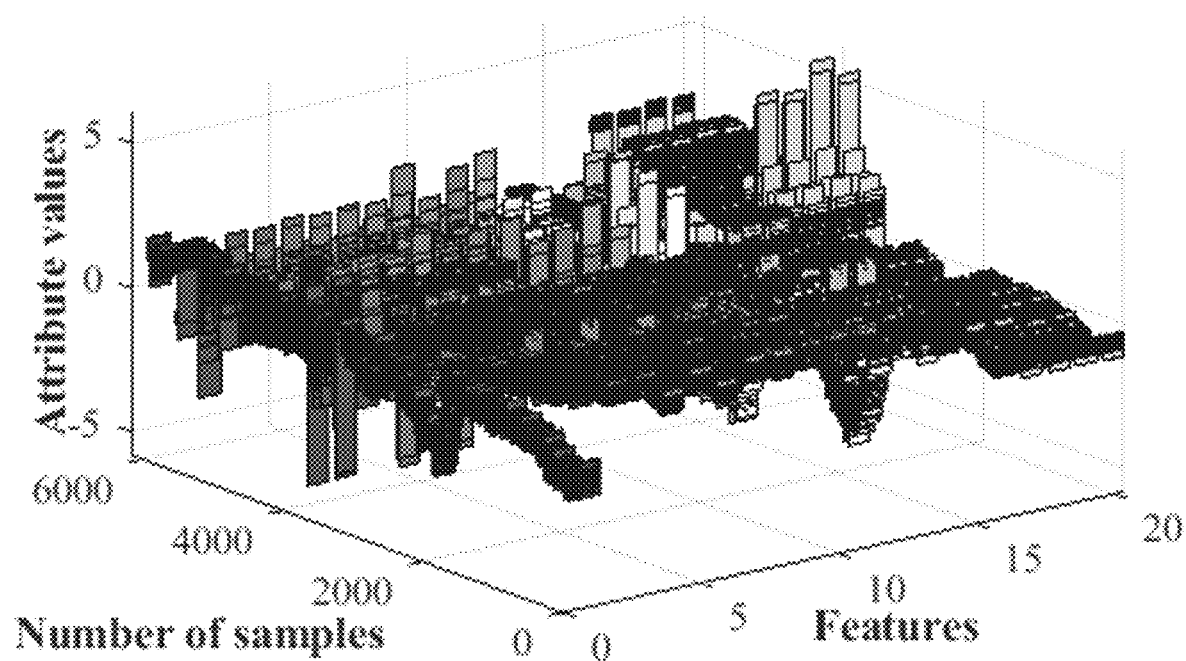
FIG. 6 is a three-dimensional diagram of a feature extracted from a target guided wave signal according to an embodiment of the present disclosure.

A target guided wave signal of the switch rail acquired in real time was denoted MS(n) with a total of 6,172 samples. Through steps S1.1, S2, and S3, the feature vector of the target guided wave signal MS(n) was extracted, namely, $ssf_{ms}=(SF_1^{dimensionless}$ to $SF_{18}^{dimensionless}$, $ESEF_1^{dimensionless}$, $ESEF_2^{dimensionless})$, as shown in FIG. 6.

Figure 7:
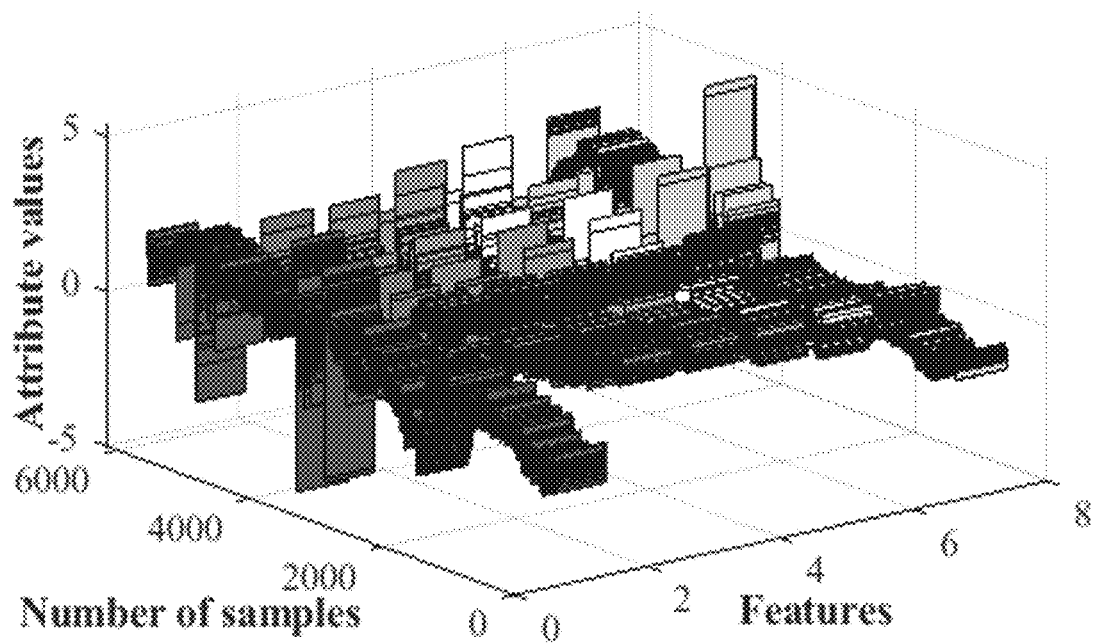
FIG. 7 is a three-dimensional diagram of a best feature subset of the target guided wave signal acquired by an iteration of the BPSO algorithm according to an embodiment of the present disclosure.
Figure 8:
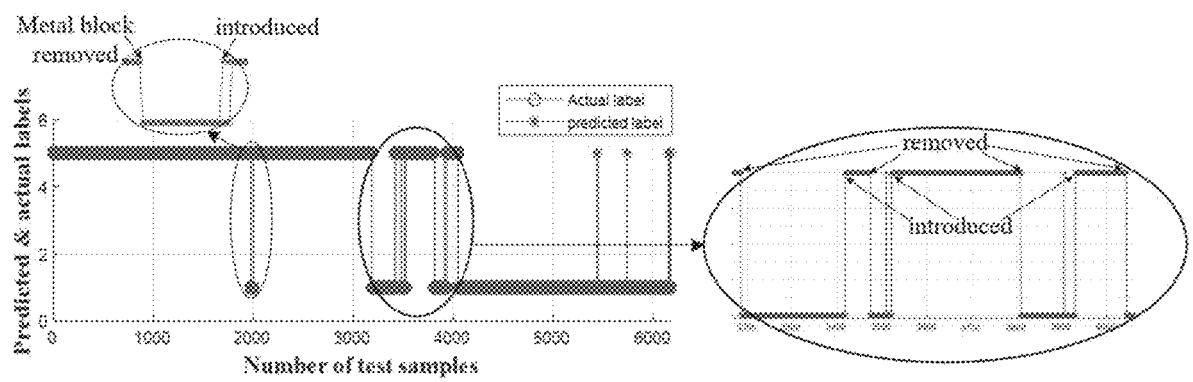
FIG. 8 is an identification result of an actual monitoring signal of a switch rail output by an automatic online defect identification model based on the least squares support vector machine (LS-SVM) according to an embodiment of the present disclosure.

Feature selection was performed on $ssf_{ms}$ according to the serial numbers of the features NF={2 3 5 7 12 19 20} in step S4 to acquire selected features $ssf_{ms}^{new}$, as shown in FIG. 7. According to step S6, the selected features $ssf_{ms}^{new}$ of the 6,172 samples were input into the automatic online defect identification model of the switch rail based on the LS-SVM acquired in step S5 to acquire an identification result of the current service state of the switch rail, as shown in FIG. 8. In FIG. 8, the target guided wave signals were acquired by attaching and removing metal block from different positions on the base of the switch rail. The automatic online defect identification model of the switch rail based on the LS-SVM might output the number 5 to indicate that the switch rail is defective and the number 1 to indicate that the switch rail is healthy. An identification result of 99.45% (6,138/6,172) indicated that there were 6,172 monitoring signals to be analyzed, and the automatic online defect identification model of the switch rail based on the LS-SVM had correctly identified 6,138 monitoring signals with an identification accuracy of 99.45%, thus satisfying the engineering monitoring requirements. In the traditional monitoring method based on independent component analysis (ICA), a defect threshold is set in order to realize automatic defect identification. The setting of the defect threshold is related to the count of the baseline signals. When the count of the baseline signals is different, the identification accuracy of the switch rail is different. This will affect the automation degree of switch rail defect identification and greatly reduce the stability of identification. The method of the present disclosure does not need to set a threshold, and the trained model automatically identifies the defects.

In practical application, the present disclosure utilizes the ultrasonic guided wave monitoring apparatus to acquire the baseline signals of the switch rail, including the defective echo signal $x'_2(n)$ and the healthy echo signal $x'_1(n)$. The defective echo signal is acquired by attaching metal block to simulate defects. The percentage of the cross-sectional area of the switch rail with metal block used in the simulation is comparable to that of the cross-sectional area of the switch rail with the simulated defects. The metal block are attached from the base to the head of the switch rail, and the metal block are spaced one meter apart. The present disclosure trains the baseline signals to acquire automatic online defect identification model of the switch rail based on the LS-SVM with desired generalization ability to different defects, and this model will monitor the service state of the switch rail in the follow-up monitoring.

Compared with the traditional method, the present disclosure can carry out defect identification under complex conditions and realize online defect monitoring of the switch rail, which has important practical significance and engineering value.

The above specific implementations are used to explain the present disclosure, rather than to limit the present disclosure. Within the spirit of the present disclosure and the protection scope of the claims, any modification and change to the present disclosure should fall within the protection scope of the present disclosure.

What is claimed is:

1. A method for monitoring a service state of a switch rail based on feature fusion, comprising:
   S1: mounting an ultrasonic guided wave monitoring apparatus on the switch rail to perform online defect identification and simulation of the switch rail and establishing a baseline signal library, wherein the ultrasonic guided wave monitoring apparatus generates a guided wave signal propagating along the switch rail and receives an echo signal of the guided wave signal:

S1.0: acquiring, by the ultrasonic guided wave monitoring apparatus, an echo signal x'(n) in real time, wherein the echo signal is acquired by sampling multiple sample points continuously in a time series; n denotes a serial number of the sample point in the echo signal; the echo signal comprises a healthy echo signal $x'_1(n)$ of the switch rail in a healthy state and a defective echo signal $x'_2(n)$ of the switch rail in a simulated defective state; and the healthy echo signal $x'_1(n)$ and the defective echo signal $x'_2(n)$ have an identical count;

S1.1: preprocessing the acquired echo signal x'(n) by normalization:

$$x(n) = \frac{x\prime(n) - \frac{1}{M}\sum x\prime(n)}{\sqrt{\frac{1}{M}\sum \left(x\prime(n) - \frac{1}{M}\sum x\prime(n)\right)^2}}$$

wherein M denotes a length of the echo signal x'(n), wherein M is a total count of sample points in the echo signal; and n denotes the serial number of the sample point in the echo signal;

through the preprocessing, a healthy baseline signal $x_1(n)$ and a defective baseline signal $x_2(n)$ are acquired; the healthy baseline signal $x_1(n)$ and the defective baseline signal $x_2(n)$ are baseline signals x(n); all different baseline signals totaling BN form the baseline signal library; and the healthy baseline signal $x_1(n)$ and the defective baseline signal $x_2(n)$ each account for half in the baseline signal library;

S2: performing feature extraction on the preprocessed baseline signal x(n);

S3: randomly extracting a healthy baseline signal of the switch rail in the healthy state from the baseline signal library and processing the healthy baseline signal to acquire a feature vector as a healthy feature vector $F_{baseline}$:

$F_{baseline}=(SF_1^{baseline}$ to $S_{18}^{phaseline}, ESEF_1^{baseline}, ESEF_2^{baseline})$ wherein $SF_1^{baseline}$ to $SF18^{baseline}$ denote first 18 feature parameters of the healthy feature vector $F_{baseline}$, respectively, and $ESEF^1_{baseline}$, $ESEF_2^{baseline}$ denote last two feature parameters of the healthy feature vector $F_{baseline}$, respectively;

nondimensionalizing each baseline signal x(n) in the baseline signal library:

$e^{(F_{monitoring}/F_{baseline})}-e$ wherein e denotes a Napierian base;

acquiring, by the nondimensionalization, a feature vector ssf of the guided wave signal of the switch rail:

$ssf=(SF_1^{dimensionless}$ to $SF_{18}^{dimensionless}, ESEF_1^{dimensionless}, ESEF_2^{dimensionless})$ wherein $SF_1^{dimensionless}$ to $SF_{18}^{dimensionless}$ denote first 18 feature parameters of the feature vector ssf of the guided wave signal of the switch rail, respectively, and $ESEF_1^{dimensionless}$, $ESEF_2^{dimensionless}$ denote last two feature parameters of the feature vector ssf of the guided wave signal of the switch rail, respectively;

S4: selecting a defect-sensitive feature from the feature vector ssf of the guided wave signal of the switch rail and acquiring, by a binary particle swarm optimization (BPSO) algorithm, a best feature subset by: calculating a fitness function of a population after each iteration, updating a global best solution gbest, and taking a final global best solution gbest as the best feature subset $SSF_{gbest}$, $SSF_{gbest}$ {$ssf_1, ssf_2, \ldots, ssf_{BN}$}, BN denoting the count of the baseline signals in the baseline signal library;

S5: acquiring an automatic online defect identification model of the switch rail based on a least squares support vector machine (LS-SVM):

taking the best feature subset $SSF_{gbest}$ as a training set of the LS-SVM and training by a cross-validation method to acquire the automatic online defect identification model of the switch rail based on the LS-SVM; and S6: monitoring the switch rail by the automatic online defect identification model of the switch rail based on the LS-SVM:

processing, by steps S1 to S3, a target echo signal MS(n) of the switch rail acquired in real time to acquire a feature vector of a guided wave signal of the switch rail using $ssf_{ms}=(SF_1^{dimensionless}$ to $SF_{18}^{dimensionless}$, $ESEF_1^{dimensionless}$, $ESEF_2^{dimensionless})$; performing, by step S4, feature selection on the feature vector $ssf_{ms}$ of the guided wave signal of the switch rail based on a serial number NF of a feature to acquire a feature vector $ssf_{ms}^{new}$ of the guided wave signal of the switch rail; inputting the feature vector $SSf_{ms}^{new}$ of the guided wave signal of the switch rail into the automatic online defect identification model of the switch rail based on the LS-SVM acquired in step S5; and outputting a current service state of the switch rail, wherein the current service state of the switch rail is a healthy state or a defective state.

2. The method for monitoring the service state of the switch rail based on the feature fusion according to claim 1, wherein step S2 specifically comprises:

S2.1: extracting a time-domain statistical feature and a power spectrum-domain statistical feature of the preprocessed baseline signal x(n), wherein the time-domain statistical feature comprises skewness ($SF_1$), kurtosis ($SF_2$), peak-to-peak value ($SF_3$), kurtosis factor ($SF_4$), root mean square (RMS) ($SF_5$), standard deviation ($SF_6$), crest factor ($SF_7$), shape factor ($SF_8$), pulse factor ($SF_9$), maximum ($SF_{15}$), variance ($SF_{16}$), minimum ($SF_{17}$), root mean square amplitude (RMSA) ($SF_{18}$), and margin factor ($SF_{10}$); and the power spectrum-domain statistical feature comprises RMS ($SF_{11}$), standard deviation ($SF_{12}$), and centroid ($SF_{13}$);

S2.2: performing feature extraction on the preprocessed baseline signal x(n) by a time-frequency analysis:

performing complementary ensemble empirical mode decomposition (CEEMD) on the baseline signal x(n) to acquire a set of intrinsic mode functions (IMFs) with different frequency bands from high to low, IMFs={$c_1(n), c_2(n), \ldots, c_N(n)$}, n∈[1,M]:

$x(n)=\Sigma_{t=1}^{N}c_t(n)+r_n(n)$ wherein $c_t(n)$ denotes a t-th IMF obtained after the CEEMD; N denotes a total count of the IMFs; and $r_n(n)$ denotes an n-th residual component;

S2.3: reconstructing the preprocessed baseline signal x(n) according to the IMF to acquire a reconstructed signal:

$y(n)=\Sigma_{q=1}^{N}c_q(n)$ wherein y(n) denotes the reconstructed signal of the baseline signal x(n) based on the CEEMD;

S2.4: extracting an average energy feature $SF_{14}$ of the baseline signal x(n) according to the reconstructed signal y(n) based on the CEEMD:

$$SF_{14} = \frac{1}{M}\sum_{n=1}^{M} y^2(n)$$

wherein y(n) denotes the reconstructed signal of the baseline signal x(n) based on the CEEMD; and S2.5: extracting a spectral entropy feature of the baseline signal x(n) according to the reconstructed signal y(n) based on the CEEMD: extracting the spectral entropy feature of the baseline signal x(n) based on the CEEMD, wherein the spectral entropy feature comprises a local spectral entropy feature $ESEF_1$ of first two IMFs and a global spectral entropy feature $ESEF_2$ of all the IMFs;

the local spectral entropy feature $ESEF_1$ is expressed as:

$$ESEF_1 = \sum_{i=1}^{M} p_i\left(e^{(1-p_i)} - 1\right)$$

$$p_i = \frac{\psi(i)^2}{\sum_{i=1}^{M} \psi(i)^2},$$

wherein $p_i$ denotes an energy coefficient of an i-th sample point in the baseline signal x(n);

and $\psi(i)$ denotes a locally reconstructed signal acquired by reconstruction using the first two IMFs;

the global spectral entropy feature $ESEF_2$ is expressed as:

$$ESEF_2 = \sum_{j=1}^{N}\sum_{i=1}^{M} p_{ij}\left(e^{(1-p_{ij})} - 1\right)$$

$$p_{ij} = \frac{c_{ij}^2}{\sum_{i=1}^{M} y(n)^2}$$

wherein $p_{ij}$ denotes an energy coefficient of an i-th sample point of a j-th IMF in the baseline signal x(n); e denotes a Napierian base; and $c_{ij}$ denotes a value of the i-th sample point of the j-th IMF; and through the above process, the feature of each baseline signal in the baseline signal library is extracted, and all feature extraction results form a feature vector $F_{monitoring}$ of the baseline signal, $F_{monitoring}$=($SF_1$ to $SF_{18}$, $ESEF_1$, $ESEF_2$).

3. The method for monitoring the service state of the switch rail based on the feature fusion according to claim 1, wherein the healthy echo signal of the switch rail in the healthy state comprises echo signals acquired from different positions of a base, a web, and a head of the switch rail in the healthy state, and comprises echo signals of the switch rail in three states of closed, open and moving, each accounting for one-third of all echo signals of the switch rail in the healthy state; and the defective echo signal of the switch rail in the simulated defective state comprises echo signals acquired from different positions of the base, the web, and the head of the switch rail in the simulated defective state, and comprises echo signals of the switch rail in the three states of closed, open and moving, each accounting for one-third of all echo signals of the switch rail in the simulated defective state.

4. The method for monitoring the service state of the switch rail based on the feature fusion according to claim 1, wherein the LS-SVM uses a Gaussian radial basis function as a kernel function, and the cross-validation method is a leave-one-out method.

5. The method for monitoring the service state of the switch rail based on the feature fusion according to claim 1, wherein the fitness function is calculated as a ratio of an intra-class Mahalanobis distance to an inter-class Mahalanobis distance by the following steps:

calculating a Mahalanobis distance of a j-th class:

$$d_j = \frac{1}{n_j}\sum_{k=1}^{n_j}\sum_{i=1}^{\gamma} \sqrt{(ssf_{ik} - v_j)^T \psi_j^{-1}(ssf_{ik} - v_j)}$$

$$(j = 1, 2, \ldots, p)$$

$$v_j = \frac{1}{2}\sum_{i=1}^{n_j} ssf_{ik}$$

wherein $v_j$ denotes a centroid vector of the j-th class; p denotes a count of classes, wherein p is 2 for the healthy state and the defective state; $\psi_j$ denotes a covariance matrix of a feature set $SSF_j$, $SSF_j$={$ssf_1$,$ssf_2$, ..., $ssf_{n_j}$}; $SSF_j$ is a set of feature vectors ssf of the guided wave signal of the switch rail based on the baseline signals of the j-th class; $ssf_{n_j}$ denotes a feature vector of the guided wave signal of the switch rail based on an $n_j$-th sample; $n_j$ denotes a count of the baseline signals of the j-th class; $\gamma$ denotes a dimension of the feature vector $ssf_i$; T denotes a matrix transposition; and $ssf_{ik}$ denotes an i-th feature in a k-th feature vector of the guided wave signal of the switch rail;

calculating the intra-class Mahalanobis distance d and the inter-class Mahalanobis distance dd by the Mahalanobis distance of the j-th class:

$$d_j = \frac{1}{n_j}\sum_{k=1}^{n_j}\sum_{i=1}^{\gamma} \sqrt{(ssf_{ik} - v_j)^T \psi_j^{-1}(ssf_{ik} - v_j)} \; (j = 1, 2, \ldots, p)$$

$$v_j = \frac{1}{n}\sum_{k=1}^{n_j} ssf_{ik}$$

wherein $\xi$ denotes a variance of a vector $v_1$; the vector $v_1$ denotes a centroid vector of a $1^{st}$ class; and a vector $v_2$ denotes a centroid vector of a $2^{nd}$ class; and calculating the fitness function of the BPSO algorithm:

$$fitness = e^{d/(dd+\tau)}$$

wherein $\tau$ denotes a non-zero parameter of the fitness function.

6. The method for monitoring the service state of the switch rail based on the feature fusion according to claim 1, wherein an output result of the automatic online defect identification model of the switch rail based on the LS-SVM is that the switch rail is healthy, or the switch rail is defective.

7. The method for monitoring the service state of the switch rail based on the feature fusion according to claim 2, wherein step S2.2 further comprises: calculating the count N of the IMFs with different frequency bands based on the length M of the input baseline signal x(n):

$$N = \lfloor \log_2(M) \rfloor$$

wherein $\lfloor \log_2(M) \rfloor$ denotes a maximum integer less than or equal to $\log_2(M)$.

\* \* \* \* \*